US010120913B1

(12) United States Patent
Mullins et al.

(10) Patent No.: US 10,120,913 B1
(45) Date of Patent: Nov. 6, 2018

(54) METHOD AND APPARATUS FOR REMOTELY MANAGED DATA EXTRACTION

(75) Inventors: Scott David Mullins, Sewickley, PA (US); Anthony John Morgan, Cranberry Township, PA (US); Suganya Bakthavatchalu, Bridgeville, PA (US)

(73) Assignee: INTALERE, INC., St. Louis, MO (US)

( * ) Notice: Subject to any disclaimer, the term of this patent is extended or adjusted under 35 U.S.C. 154(b) by 1509 days.

(21) Appl. No.: 13/221,407

(22) Filed: Aug. 30, 2011

(51) Int. Cl.
*G06F 17/30* (2006.01)

(52) U.S. Cl.
CPC .. *G06F 17/30545* (2013.01); *G06F 17/30427* (2013.01); *G06F 17/30985* (2013.01)

(58) Field of Classification Search
CPC ......... G06F 17/30427; G06F 17/30545; G06F 17/30498; G06F 17/30985
USPC ....................................................... 707/722
See application file for complete search history.

(56) References Cited

U.S. PATENT DOCUMENTS

| | | | |
|---|---|---|---|
| 6,341,277 B1* | 1/2002 | Coden | G06F 17/30451 707/718 |
| 6,697,852 B1 | 2/2004 | Ryu | |
| 6,704,726 B1* | 3/2004 | Amouroux | G06F 17/30433 |
| 7,383,287 B2 | 6/2008 | Ellison et al. | |
| 7,512,623 B2* | 3/2009 | Apps | G06N 5/025 |
| 7,523,505 B2 | 4/2009 | Menschik et al. | |
| 7,599,924 B2 | 10/2009 | Dettinger et al. | |
| 8,725,853 B2* | 5/2014 | Sellers | H04L 41/0213 709/223 |
| 2003/0158754 A1 | 8/2003 | Elkind | |
| 2003/0195765 A1 | 10/2003 | Sehgal et al. | |
| 2004/0015408 A1* | 1/2004 | Rauen et al. | 705/26 |
| 2004/0064341 A1 | 4/2004 | Langan et al. | |
| 2005/0027584 A1 | 2/2005 | Fusari | |
| 2005/0240354 A1* | 10/2005 | Mamou | G06F 17/30563 702/19 |
| 2006/0069717 A1* | 3/2006 | Mamou | G06F 17/30563 709/203 |
| 2006/0149156 A1 | 7/2006 | Cochran et al. | |
| 2006/0259984 A1* | 11/2006 | Juneau | H04L 67/18 726/28 |
| 2007/0038610 A1* | 2/2007 | Omoigui | 707/3 |
| 2007/0100967 A1* | 5/2007 | Smith | G06F 8/20 709/219 |

(Continued)

OTHER PUBLICATIONS

Bouguettaya et al., "Supporting Dynamic Interactions among Web-based Information Sources", IEEE, Sep./Oct. 2000, pp. 779-801, vol. 12, No. 5.

(Continued)

*Primary Examiner* — Merilyn P Nguyen
(74) *Attorney, Agent, or Firm* — Thompson Coburn LLP

(57) ABSTRACT

Techniques for remotely managed data extraction are disclosed whereby a client data extractor (CDE) is installed on a customer computer system to extract data from the customer computer system for transmission to a destination. Soft configuration techniques can be employed where the configuration data for governing the data extraction are provided to the customer computer system from a service provider computer system on an as-needed basis. Moreover, during extraction, data translation from a source format to a destination format can be performed at the query level to improve efficiency.

27 Claims, 15 Drawing Sheets

(56) References Cited

U.S. PATENT DOCUMENTS

| | | |
|---|---|---|
| 2007/0192140 A1 | 8/2007 | Gropper |
| 2008/0306872 A1 | 12/2008 | Felsher |
| 2009/0112882 A1 | 4/2009 | Maresh et al. |
| 2009/0164255 A1 | 6/2009 | Menschik et al. |
| 2009/0183095 A1 | 7/2009 | Deitsch et al. |
| 2009/0254571 A1 | 10/2009 | Cassel et al. |
| 2009/0254971 A1 | 10/2009 | Herz et al. |
| 2009/0259490 A1 | 10/2009 | Colang et al. |
| 2011/0282969 A1* | 11/2011 | Iyer et al. .................. 709/217 |
| 2013/0238604 A1* | 9/2013 | Robie .............. G06F 17/30427 707/722 |

OTHER PUBLICATIONS

Chao et al., "A Mobile Agent Framework for Telecardiology", Coventry University, Oct. 25, 2001, 4 pages.

Halamka et al., "CareWeb, A Web-Based Medical Record for an Integrated Health Care Delivery System", International Journal of Medical Informatics, 1999, pp. 1-8, vol. 54.

Hripcsak, "WebCIS: Large Scale Deployment of a Web-based Clinical Information System", Columbia University, 1999, pp. 804-808.

Pearson, "Using XML to Bridge the GP Hospital Divide", URL: http://www.gca.org/papers/xmleurope2001/papers/html/sid-04-07.html, 4 pages.

\* cited by examiner

Figure 5

| CDE Data Map via Query | | |
|---|---|---|
| Client Query | Upload XML | Destination Upload |
| select customer_field_1 as Amerinet_Field_1, customer_field_2 as Amerinet_Field_2, customer_field_3 as Amerinet_Field_3, customer_field_4 as Amerinet_Field_4, customer_field_5 as Amerinet_Field_5, customer_field_6 as Amerinet_Field_6, customer_field_7 as Amerinet_Field_7 from Customer_table Where ... | <?xml version="1.0" standalone="yes"?><br><NewDataSet><br><Table1 Amerinet_Field_1="22733" Amerinet_Field_2="10000001" Amerinet_Field_3="HAM" Amerinet_Field_4="NONE" Amerinet_Field_5="U" Amerinet_Field_6="HAM" Amerinet_Field_7="ALL"/><br><Table1 Amerinet_Field_1="22733" Amerinet_Field_2="9300009" Amerinet_Field_3="HAM" Amerinet_Field_4="NONE" Amerinet_Field_5="U" Amerinet_Field_6="HAM" Amerinet_Field_7="ALL"/><br>...<br></NewDataSet> | insert into Amerinet_Table_1 (Amerinet_Field_1, Amerinet_Field_2, Amerinet_Field_3, Amerinet_Field_4, Amerinet_Field_5, Amerinet_Field_6, Amerinet_Field_7) select from xml ... |
| This is the query that can be entered into the Admin screens and then transmitted to the client at start up. The "as" statement translates, at extraction time, the customer field name to a field name for use at the destination | The XML file is from the extracted data for transmission to the destination servers. The fields are represented using the destination field names | This column represents the function of loading the XML file into the destination data store |

METHOD AND APPARATUS FOR REMOTELY MANAGED DATA EXTRACTION

BACKGROUND AND SUMMARY OF THE INVENTION

Many organizations, such as hospitals or other health care providers, have a recurring need to analyze their data, which may be stored at several locations across disparate resources (e.g., with the hospital example, separate databases for financial information, supply information and clinical information). A service provider such as the assignee of this invention can provide a service to such organizations whereby the service provider collects this data and then houses the data in a normalized data warehouse for improved customer access and analysis.

The data collection effort involves extracting desired data from the appropriate data sources within the organization. In an effort to improve the process of data extraction from client systems, the inventors herein disclose a technique for remotely managing the queries and connection strings that are used during the extraction process from client systems. By remotely managing these queries and connection strings, users on the client side of the system are alleviated of much of the burden that past extraction systems have imposed upon them.

Thus, in accordance with an exemplary aspect of the disclosure, the inventors disclose a computer-implemented data extraction method comprising (1) receiving, at a first computer system, a query string and a connection string from a second computer system, wherein the second computer system is remote from the first computer system, (2) connecting to a data source within the first computer system based on the received connection string, (3) querying the data source based on the received query string, the query string defining the data sought to be extracted and a translation of the data sought to be extracted from a format of the data source to a format of a destination, (4) receiving data from the data source in response to the query, (5) translating the received data to the format of the destination based on the received query string, (6) assembling the translated data into a data structure, (7) sending the data structure to the destination, wherein the method steps are performed by a processor resident within the first computer system.

In accordance with another exemplary aspect of the disclosure, the inventors disclose a computer program product for data extraction comprising a plurality of instructions that are executable by a processor to (1) receive, at a first computer system, a query string and a connection string from a second computer system, wherein the second computer system is remote from the first computer system, (2) connect to a data source within the first computer system based on the received connection string, (3) query the data source based on the received query string, the query string configured to define the data sought to be extracted and a translation of the data sought to be extracted from a format of the data source to a format of a destination, (4) receive data from the data source in response to the query, (5) translate the received data to the format of the destination based on the received query string, (6) assemble the translated data into a data structure, and (7) send the data structure to the destination, wherein the plurality of instructions are resident on a non-transitory computer-readable storage medium.

In accordance with yet another exemplary aspect of the disclosure, the inventors disclose an apparatus for data extraction comprising a processor resident on a first computer system, the processor configured to (1) receive a query string and a connection string from a second computer system, wherein the second computer system is remote from the first computer system, (2) connect to a data source within the first computer system based on the received connection string, (3) query the database based on the received query string, the query string configured to define the data sought to be extracted and a translation of the data sought to be extracted from a format of the data source to a format of a destination, (4) receive data from the data source in response to the query, (5) translate the received data to the format of the destination based on the received query string, (6) assemble the translated data into a data structure, and (7) send the data structure to the destination.

In accordance with yet another exemplary aspect of the disclosure, the inventors further disclose a computer-implemented data extraction method comprising a client data extractor (CDE) module executing on a first computer system to perform a data extraction from a database of the first computer system, wherein the CDE module executing step comprises (1) the CDE module determining whether a data extraction is to be performed, and (2) in response to determining that a data extraction is to be performed (i) the CDE module sending a request to a second computer system, (ii) obtaining configuration data from the second computer system in response to the sent request, the configuration data comprising a query string and a connection string for use in the data extraction, (iii) connecting to the database using the connection string, (iv) extracting data from the connected database using the query string, wherein the extracting step includes translating the extracted data from a format of the database to a format of a destination during extraction at a query level based on data within the query string, (v) assembling the extracted data into a data structure, and (vi) sending the assembled data structure to a destination.

In accordance with still another exemplary aspect of the disclosure, the inventors further disclose a system for data extraction, the system comprising (1) a first computer system, and (2) a second computer system for communication with the first computer system via a network, wherein the first computer system comprises a data source and a processor, the processor configured to execute a client data extractor (CDE) module to perform a data extraction from the data source, wherein the second computer system comprises at least one server and a memory, wherein memory is configured to store configuration data in association with a plurality of identifiers, the configuration data comprising a plurality of query strings and a plurality of connection strings, a plurality of the query strings being configured to define (1) the data sought to be extracted and (2) a translation of the data sought to be extracted from a format of a data source to a format of a destination, wherein the CDE module is configured to (1) determine whether a data extraction is to be performed, and (2) in response to a determination that a data extraction is to be performed (1) send a request to the second computer system, the request comprising a request for configuration data and an identifier, wherein the at least one server is configured to (1) receive the request for configuration data, and (2) in response to the received request, automatically (i) access the memory to identify the configuration data associated with the identifier within the received request, and (ii) communicate the identified configuration data to the first computer system, wherein the CDE module is configured to (1) obtain the communicated configuration data from the second computer system, the communicated configuration data comprising a query string and a connection string for use in the data extraction, (2) connect to the data source based on the connection string, (3) extract data from the connected data source based on the query string, wherein the extracting operation is configured to translate the extracted data from a format of the data source to a format of a destination during extraction at a query level based on data within the query string, (4) assemble the extracted data into a data structure, and (5) send the assembled data structure to the second computer system, and wherein the at least one server is further configured to (1) receive the sent data structure, and (2) in response to the received data structure, automatically store the extracted data within the received data structure in the memory In accordance with still another exemplary aspect of the disclosure, the inventors further disclose a computer-implemented method for remotely managing a data extraction, the method comprising (1) storing a data structure in a memory of a first computer system, the data structure comprising a plurality of query strings and connection strings, each query string and connection string being associated with an identifier, a plurality of the query strings being configured to define (i) the data sought to be extracted and (ii) a translation of the data sought to be extracted from a format of the database to a format of a destination, (2) receiving a request for a query string and a connection string from a second computer system, the second computer system being remote from the first computer system, and the received request including an identifier, (3) accessing the data structure to identify the query string and the connection string associated with the identifier included in the received request, and (4) communicating the identified query string and connection string to the second computer system for use by the second computer system to extract data from a database within the second computer system, and wherein the method steps are performed by a processor resident within the first computer system.

In accordance with yet another exemplary aspect of the disclosure, the inventors disclose a computer program product for remotely managing a data extraction, the computer program product comprising a plurality of instructions that are executable by a processor to (1) receive a request for a query string and a connection string from a second computer system, the second computer system being remote from the first computer system, and the received request including an identifier, (2) access a data structure in a memory of a first computer system, the data structure comprising a plurality of query strings and connection strings, each query string and connection string being associated with an identifier, a plurality of the query strings being configured to define (i) the data sought to be extracted and (ii) a translation of the data sought to be extracted from a format of the database to a format of a destination, (3) identify the query string and the connection string within the accessed data structure that are associated with the identifier included in the received request, and (4) communicate the identified query string and connection string to the second computer system for use by the second computer system to extract data from a database within the second computer system, and wherein the plurality of instructions are resident on a non-transitory computer-readable storage medium.

Moreover, in accordance with yet another exemplary aspect of the disclosure, the inventors disclose an apparatus for remotely managing a data extraction, the apparatus comprising (1) a memory for storing a data structure, the data structure comprising a plurality of query strings and connection strings, each query string and connection string being associated with an identifier, a plurality of the query strings being configured to define (i) the data sought to be extracted and (ii) a translation of the data sought to be extracted from a format of the database to a format of a destination, and (2) a processor for communication with the memory, the processor configured to (i) receive a request for a query string and a connection string from a remote computer system, the received request including an identifier, (ii) access the data structure in the memory to identify the query string and the connection string associated with the identifier included in the received request, and (iii) communicate the identified query string and connection string to the remote computer system for use by the remote computer system to extract data from a database within the remote computer system.

Through the soft configuration techniques disclosed herein, customers can be insulated from the myriad of connections and queries that are needed to support desired data extractions. That is, hard configurations can be avoided, and embodiments of the disclosure can leverage existing hardware on the customer's computer system without requiring additional software beyond the extraction software described herein. As such, queries and connections can be managed remotely from the customer and data extractions can be updated with new queries and connection strings without the customer needing to reinstall new software or make similar changes.

Furthermore, by performing source-to-destination translation at the query level, embodiments of the disclosure can avoid the need for separate data mapping components and improve the efficiency and flexibility of extraction.

These and other features and advantages of preferred embodiments of the present invention will be apparent to those having ordinary skill in the art upon review of the specification and drawings contained herein.

BRIEF DESCRIPTION OF THE DRAWINGS

FIG. 5 depicts how data mapping can be encoded into queries for use during remotely controlled data extraction.

FIGS. 6(a)-(i) depict various exemplary graphical user interfaces (GUIs) for interacting with an exemplary embodiment.

DETAILED DESCRIPTION OF THE PREFERRED EMBODIMENTS

Figure 1:
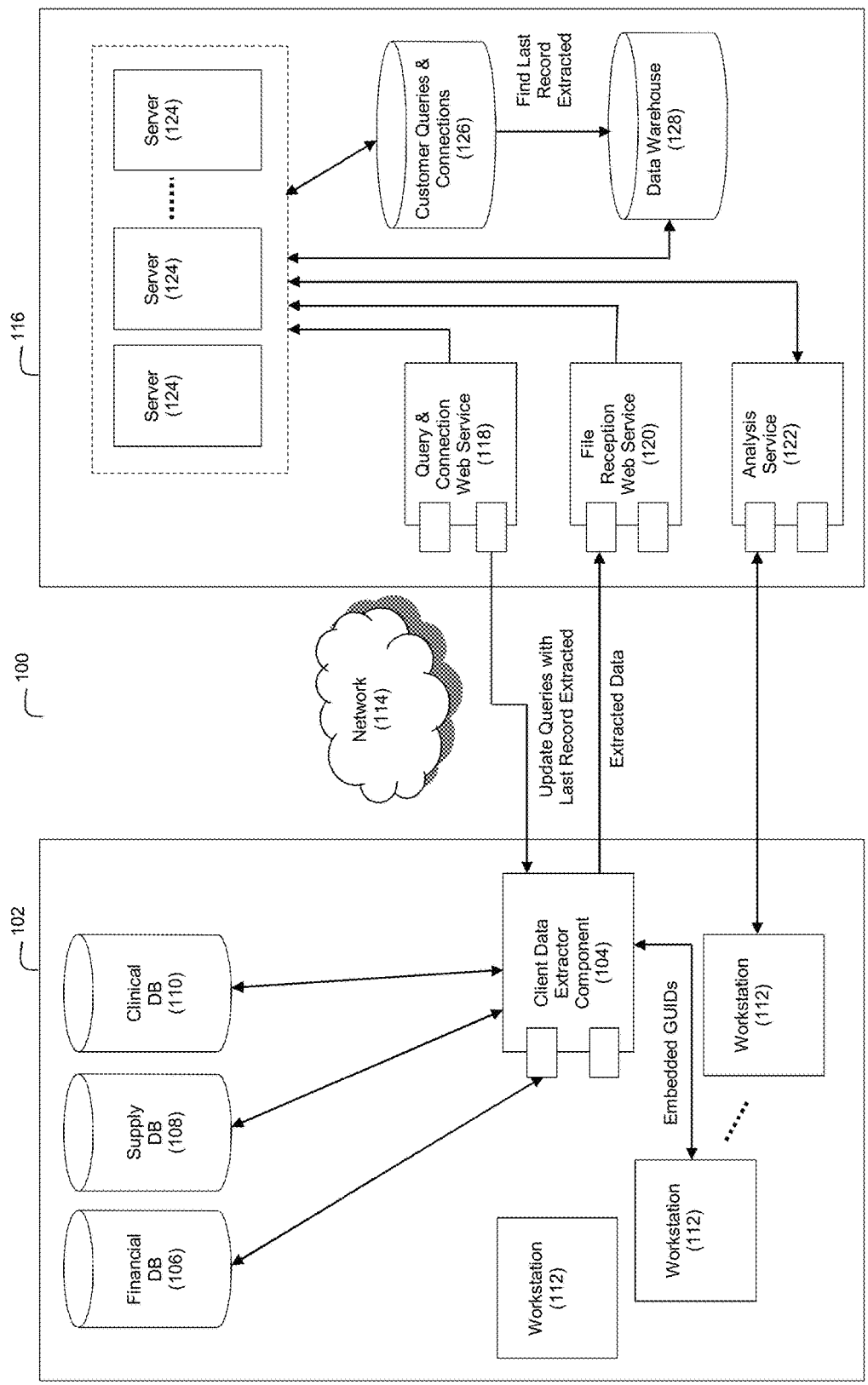
FIG. 1 depicts an exemplary system for remotely controlled data extraction in accordance with an embodiment.

FIG. 1 depicts an exemplary system 100 for performing remotely controlled data extraction. The system 100 comprises a customer computer system 102 and a service provider computer system 116, wherein a network 114 interconnects the two computer systems 102 and 116. The network 114 can be any communications network, such as the Internet, a private telecommunications network, etc. Communications over the network 114 between the computer system 102 and the computer system 116 can be made via any a number of protocols, for example HTTP, HTTPS, etc.

Each computer system 102 and 116 employs at least one processor and associated memory which can be configured to implement the processes described herein in accordance with exemplary embodiments. Such a processor may comprise a single processor or multiple processors, including multiple processors that are physically remote from each other as well as multiple subprocessors (for example two CPU cores or separate CPUs). Similarly, the memory can take the form of one or more physical memories. Moreover, the memory can be physically remote from the processor if desired by a practitioner, such as a remote database of data and/or program instructions accessible to the processor via a network such as the Internet. Examples of suitable memories can be RAM memory, ROM memory, hard disk drive memory, etc. Each processor can be configured to execute one or more software programs. These software programs can take the form of a plurality of processor-executable instructions that are resident on a non-transitory computer-readable storage medium such as the processor's associated memory. Moreover, such a processor and associated memory can be implemented in one or more servers, workstations, and other computational devices.

The customer computer system 102 can be operated by an organization such as a hospital or health care provider that stores large amounts of data across disparate resources. The service provider computer system 116 can be operated by an entity that provides data warehousing and data analytics services for the organization that operates customer computer system 102.

Exemplary customer computer system 102 may comprise multiple data sources in which an organization's data is stored (e.g., for a hospital, databases such as a financial database 106 where financial information is stored, a supply database 108 where supply data is stored, and clinical database 100 where clinical data is stored). The data sources may comprise databases in which relational data is stored. Customer computer system 102 can also include multiple servers, workstations 112, etc.

A client data extractor (CDE) component 104 is a software program that can be installed within the customer computer system 102 to perform desired data extractions in accordance with exemplary embodiments disclosed herein. The CDE 104 can be resident on one or more servers and/or workstations 112 within customer computer system 102. While any of a number of languages and platforms can be used to create and implement the CDE 104, in one exemplary embodiment, the CDE 104 can be implemented as a light weight Win32 application with Windows Communication Foundation (WCF) services for communication with the service provider computer system 116. The CDE 104 can be installed on the customer computer system 102 after the customer computer system 102 downloads the CDE 104 from a source such as the service provider computer system 116 (e.g., a one-click download install).

The CDE 104 manages the extraction of desired data from the client computer system 102 using the queries and database connection strings received from the remote service provider computer system 116, as explained in greater detail below. The CDE 104 then assembles the extracted data for transmission to the service provider computer system 116 or some other destination, preferably via a web service. Upon receipt of the data transmission, the service provider computer system 116 (or other destination) can be configured to transform and load the extracted data into a normalized data warehouse for later access and analysis by the customer.

Exemplary service provider computer system 116 may also comprise multiple databases and multiple servers. Furthermore, various software programs resident on the servers can be executed to interact with the customer computer system 102 and databases within the service provider computer system 116 to provide data extraction, data warehousing, and data analysis services. Examples of software programs that can be executed by one or more servers 124 can include a query and connection web service component 118, a file reception web service 120, and an analysis service 122, as explained in greater detail below. A customer queries and connections database 126 can be used to store the queries and connection strings used for extracting various customers' data. Also, a data warehouse 128 can serve as a repository for all data that has been extracted, normalized and loaded into the service provider's computer system 116 for later access by interested parties.

Figure 2:
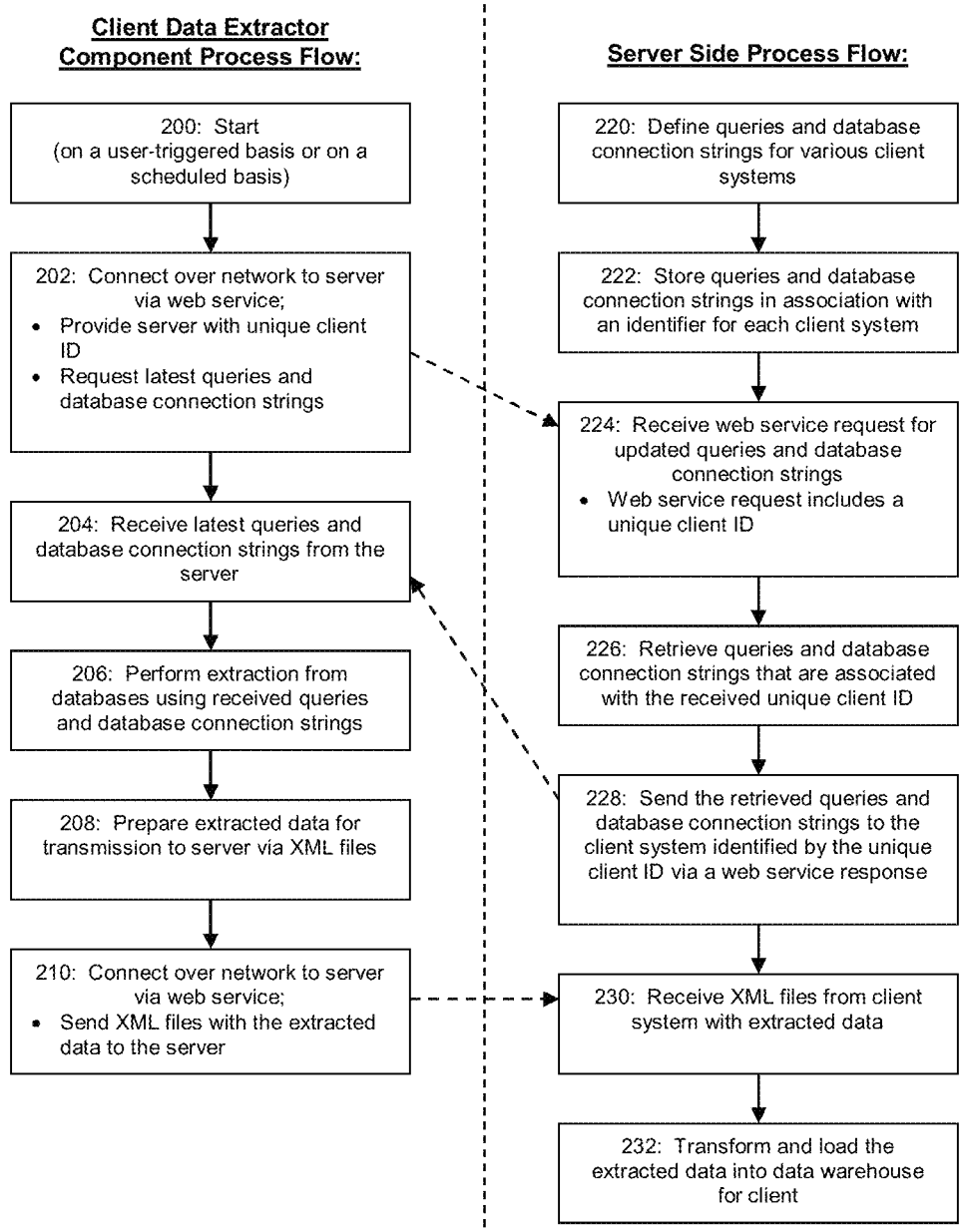
FIG. 2 depicts exemplary process flows for a client side and a server side with respect to remotely controlled data extraction.
Figure 3A:
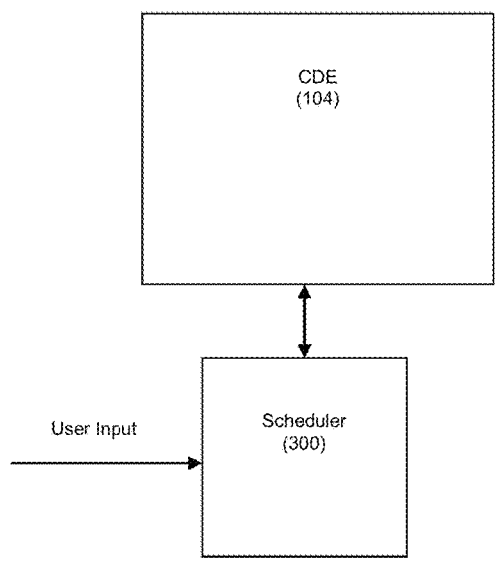
FIGS. 3(a) and (b) depict exemplary embodiments for scheduling data extractions.
Figure 3B:
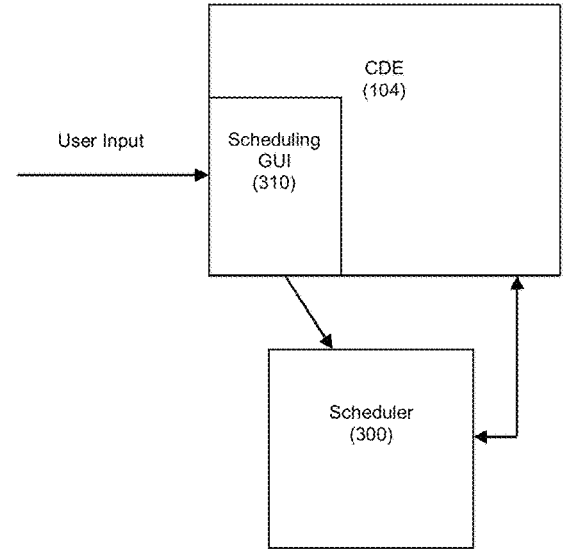

FIG. 2 depicts exemplary process flows for the CDE 104 and server side (i.e., the side of the service provider computer system 116) in connection with data extraction. With reference to the CDE side of FIG. 2, the CDE process flow begins at step 200 where the CDE begins operation. This onset can be on a user-triggered basis or on a scheduled basis. When configured to start on a user-triggered basis, the CDE can begin operation in response to a user (e.g., an employee of the organization that operates the customer computer system 102) initiating the CDE through input via his or her workstation. When configured to start on a scheduled basis, a user (e.g., an organization employee, an administrator employed by the service provider, etc.) can define a schedule of CDE operation. In an exemplary embodiment shown in FIG. 3(*a*), a user can access a separate scheduler 300 available on the computer system to define the operating schedule (e.g., where the CDE 104 executes on a computer employing a Windows operating system, the separate Windows scheduler). In another exemplary embodiment shown in FIG. 3(*b*), the graphical user interfaces (GUIs) available to the user through the CDE can include a GUI 310 that permits the user to directly manage the separate scheduler 300 from the CDE.

Figure 4:
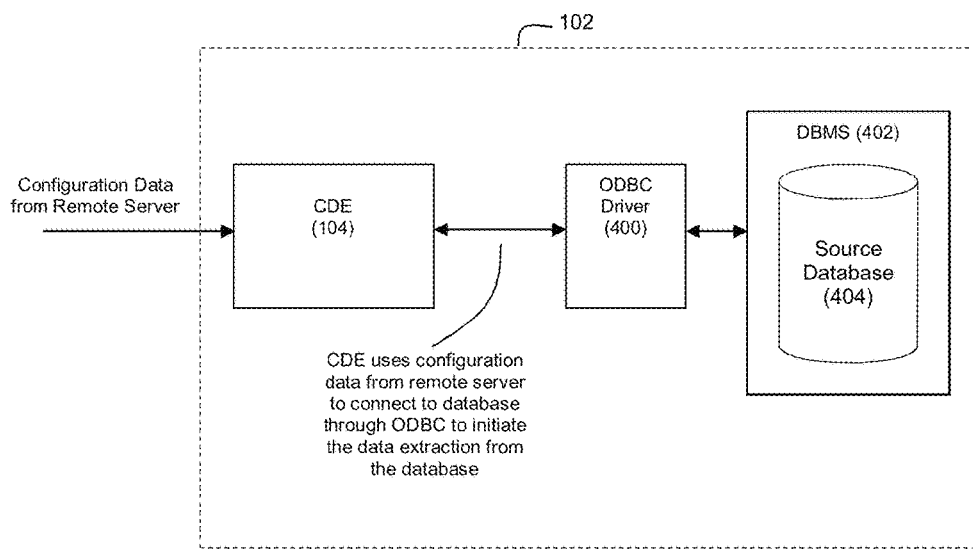
FIG. 4 depicts how data extraction can be controlled using a soft configuration.

Next, at step 202, the CDE connects over network 114 to the service provider computer system 116 to obtain the configuration data for use in performing the desired data extraction. This configuration data can take the form of the connection strings and queries needed to extract the desired data from a database of the customer computer system 102. In this manner, the CDE employs a soft configuration as shown in FIG. 4. The conventional way of configuring a database connection involves hard-coding the configuration data into the software module that interacts with a database management system (DBMS) 402 via an Open Database Connectivity (ODBC) driver 400. This can be referred to as a hard configuration. However, with the embodiment of FIG. 4, soft configuration is employed. With soft configuration, the configuration data used to define how the CDE 104 is to connect with a source database 404 is not inflexibly hard-coded into the CDE 104 but instead received by the CDE 104 on an on-demand basis from a remote server (e.g., the service provider computer system 116). This alleviates the customer from maintaining and managing the configuration data and permits the CDE 104 to run transparently from the perspective of the customer. Once in receipt of the configuration data from the remote server, the CDE 104 uses this configuration data to connect with and query the source database 404 via ODBC driver 400, where the ODBC driver 400 operates to pass the connection strings and queries from the CDE 104 to the DBMS 402 in the DBMS's native format for obtaining desired data from the source database 404.

At step 202, the CDE can connect to a server 124 via a web service request to the query and connection web service component 118. This web service request, which can take the form of a message within a Simple Object Access Protocol (SOAP) envelope, serves as a request for the latest queries and connection strings to be used in the data extraction process on the customer computer system, and it can include a unique identifier for the customer to permit the server 124 to identify the appropriate queries and connection strings for that customer which are stored in database 126. Such a unique identifier can take the form of a globally unique identifier (GUID). The GUID can be a 36 character hex code or the like. When a new customer is set up, a server 124 can automatically generate this GUID, which is then communicated (e.g., emailed) to the customer for the customer to enter into a GUI field of the CDE when the CDE is installed on the customer computer system. The GUID can then be stored locally on the customer computer system, preferably embedded within the CDE, so the customer need not enter it again during subsequent operations of the CDE. Furthermore, database 126 can store the queries and connection strings for each customer in association with that customer's GUID. In this fashion, the server 124 can use the GUID received as part of the web service request of step 202 to verify that the sender of the web service request is entitled to the queries and connection strings associated with the GUID in database 126.

At step 204, in response to the web service request, the CDE receives a web service response from the service provider computer system. This web service response includes the latest queries and connection strings for the customer from the service provider computer system. The table below shows exemplary fields that can be included in this web service response, including the queries and connection strings for use to govern the data extraction.

| CDE Input Object General Format: | |
| --- | --- |
| Column Name | General Description |
| QueryKey | This can be a simple numeric key to identify the query |
| ConnectionString | Each query can be associated with a database connection string. This allows simplification when multiple queries are multiple data sources are involved. |
| Query | This can be a SQL-based query. Preferably, this query is written in the flavor of SQL needed for the target environment (e.g., tSQL for SQL servers, pl/SQL for Oracle, etc. |
| ChunkSize | This value can be used to split an output file to permit easier uploads to a destination. This value can be based on a calculation of the expected row size, which can begin with a default value of 2096. |
| FileName | This is the name of the file to be written to during extraction. |

Then, at step 206, the CDE uses the connection strings and queries to connect to the appropriate database(s) within the customer computer system and initiate a database query to retrieve desired data. In this fashion, the CDE extracts desired data from the customer computer system. It should be understood that this extracted data can include metadata for the data sought by the queries.

At step 208, the CDE prepares the extracted data for transmission to the service provider computer system 116. As explained below, the queries received from the remote server are configured to format the extracted data for its target destination (e.g., a database on the service provider computer system 116). As such, the CDE performs data translation with respect to the target destination at the query level. This eliminates the need for the system 100 to employ a separate mapping component.

Also, in an exemplary embodiment, at step 208, the CDE can prepare one or more XML files for transmission to the service provider computer system. These XML files can be segmented based on a configured blocking factor (e.g., the ChunkSize value identified in the table above) to allow larger data sets to be uploaded to the destination at step 210 in multiple pieces for improved transmission speed performance and bandwidth management. This transmission to the destination can be performed by the CDE using a web service transmission to the file service reception web service component 120 executed by one of the servers 124 of the service provider computer system 116.

FIG. 5 illustrates an exemplary embodiment of how data translation can be performed at the query level. In the left column of FIG. 5, an exemplary query for a customer database is shown. This query can include coding that translates desired data fields from the field names of the source database to the field names of the destination database. This is depicted in FIG. 5 via the "as" statements, (e.g., the "as" statement that translates the customer field name "customer_field_2" to the destination field name "Amerinet_Field_2") for thereby translating the data for those fields from a source-specific fields to destination-specific fields. Thus, at extraction, the CDE will already associate the extracted data with the fields of the destination's data structures.

The middle column of FIG. 5 shows how the XML data structure can be created for transmission to the destination. As can be seen, the extracted data is populated into the XML file in association with the translated field names corresponding to the destination. Thus, the data value "19300009" that is stored in "customer_field_2" of the source database is translated during extraction at the query level to the field "Amerinet_Field_2" within the XML file for upload. As shown in the right column of FIG. 5, this data can be directly loaded into the destination database without further field name translations. Thus, a separate mapping component is not needed for translating the extracted data.

With reference to the server side of FIG. 2, the server side process flow begins at step 220. At step 220, a user defines the queries and database connection strings that are to be used for subsequent data extractions. FIGS. 6(*a*)-(*i*), to be described in greater detail below, depict exemplary GUIs that a user can access to manage these queries and connection strings for a number of different customers. The user can be an appropriately authorized user who is employed by the service provider (e.g., an administrator who has been delegated authority to manage queries and connection strings for a particular customer). However, it should be understood that, if desired by a practitioner, the user could be someone else, such as an authorized employee of the customer or some third party. For example, a user who is an employee of the customer can access one or more servers 124 of the service provider computer system 116 to access these GUIs over a network such as the Internet.

At step 222, the queries and connection strings that are entered by the user are stored in a database (e.g., database 126) in association with an identifier for a customer (e.g., the customer's GUID). Thus, database 126 can define a data structure that associates the queries and connection strings for each customer with identifiers for those customers.

At step 224, the service provider computer system receives the web service request that was sent by the CDE at step 202. As previously noted, this web service request will include an identifier for the customer such as the customer's GUID. The query and connection web service component 118 shown in FIG. 1 can perform this step.

In this fashion, at step 226, the query and connection web service component 118 can use the GUID received as part of the web service request of step 202 to verify that the sender of the web service request is entitled to the queries and connection strings associated with the GUID in database 126. Furthermore, at step 226, the query and connection web service component 118 can retrieve the queries and connection strings associated with the customer that sent the web service request.

Furthermore, to reduce redundant data extractions, the query and connection web service component 118 can be configured to modify the retrieved queries such that the queries do not target customer data that has already been extracted. For example, the system can check the data warehouse 128 to find the last record that was extracted from the customer computer system for each relevant customer query. Such records stored in the warehouse can be stored in association with a date and time stamp to enable such a search. Based on this last record, the retrieved queries can be modified to target only data in the customer database having a creation date/time stamp or a modification date/time stamp after the date/time stamp for this last record. Alternatively, queries in database 126 can be automatically updated each time an extraction is performed such that the query reflects the most recent data extraction. In this fashion, the queries will already be updated when they are retrieved for delivery to the CDE. As another alternative, the system can store a separate time/record-key pair that provides a direct pointer to the last record retrieved.

Next, at step 228, the query and connection web service component 118 returns the latest queries and connection strings to the CDE via a web service response. The table shown above provides an exemplary framework for the data objects contained within such a web service response.

At this point, the server side waits until the CDE performs its data extraction. Then, at step 230, the service provider computer system 116 receives the XML data structure (e.g., a plurality of XML files) from the CDE, where this XML data structure contains the extracted data that is responsive to the queries and connection strings provided at step 228. The file reception web service component 120 can be configured to perform this step. Upon receipt of the XML files from the CDE, the file reception web service component 120 can create a directory in which the segmented data from the XML files is organized. Then, at step 232, the extracted data in this directory is loaded into the data warehouse 128 in association with the customer. Optionally, such extracted data can be further transformed as needed for one or more destinations before loading. Also, the raw XML files received at step 230 can be stored in an archive for possible future access by a user.

The service provider computer system 116 can then notify the customer computer system that its data is ready for analysis. A user of the customer computer system can then perform such analysis through an analysis service 122 resident on the service provider computer system for execution by a server 124 to interact with data warehouse 128 and provide business intelligence functions to the user in connection with analyzing this data.

As noted above, FIGS. 6(*a*)-(*i*) depict exemplary GUIs that a user can access to manage the queries and connection strings stored in database 126. FIG. 6(*a*) depicts an exemplary home screen for access by a user. This home screen can include links for user selection such as a "Users" link, a "Connections" link, and a "Queries" link.

In response to user selection of the "Users" link, a GUI such as the one shown in FIG. 6(*b*) can be presented to the user. This GUI can list the different authorized users. For example, the GUI of FIG. 6(*b*) shows a table that lists each user by their name (the UserName column), the name of the customer for which that user manages queries and connection strings (the "Provider" column), a file path that tracks the path on the service provider computer system 116 where the raw extracted data is archived for a particular user (the FilePath column), and an identifier corresponding to the customer shown in the Provider column (the GUID column).

If an appropriately authorized user selects an "edit" link shown in FIG. 6(*b*), the user is presented with the GUI of FIG. 6(*e*), which provides the user with data entry fields for editing any of the columns of the table shown in FIG. 6(*a*). A similar GUI (with blank data entry fields) can be presented to the user in response to user selection of the "Add New User" button of FIG. 6(*b*). In this fashion, users can manage the customers for which they oversee data extraction.

In response to user selection of the "Connections" link via one of the GUIs, a GUI such as the one shown in FIG. 6(*c*) can be presented to the user. This connections management GUI includes a field for selecting a customer to thereby access the connection information for that customer. This field can be filled from a drop down menu that is populated with a list of all of the customers for which queries and connection strings are maintained in database 126. FIG. 6(*d*) depicts an exemplary connections management GUI after a customer has been selected. The GUI of FIG. 6(*d*) lists all connections that are stored for the selected customer. In this example, it can be seen that the selected customer is "Amerinet Central", and one connection is stored for this customer, as shown in the table displayed on the GUI of FIG. 6(*d*). This table identifies connections by connection name, the corresponding database for the connection, and a general description of the connection.

If an appropriately authorized user selects an "edit" link shown in FIG. 6(*d*), the user is presented with the GUI of FIG. 6(*f*), which provides the user with data entry fields for connection information for the connection corresponding to the selected "edit" link. A similar GUI (with blank data entry fields) can be presented to the user in response to user selection of the "Add New Connection" button of FIG. 6(*d*). The data entry fields of FIG. 6(*f*) include a data entry field in which the user identifies the database connection string corresponding to the database identified for the subject connection. As can be seen, the connection string may comprise coded data including data for fields that identify the relevant database driver, the relevant server, the relevant user ID and password, etc. for connecting to the appropriate database to perform data extraction. Through the checkbox shown in FIG. 6(*f*), the user can control whether the subject connection is active or inactive. The query and connection web service component 118 can be configured to retrieve only the connection strings for active connections at step 226.

In response to user selection of the "Queries" link via one of the GUIs, a GUI such as the one shown in FIG. 6(*g*) can be presented to the user. This query search GUI includes a field for selecting a customer to access the connection information for that customer. Similar to the customer selection field of FIG. 6(c), this field can be filled from a drop down menu that is populated with a list of all of the customers for which queries and connection strings are maintained in database 126. The customer selected in this field defines the customer for which the system will search for queries that are present in database 126. This search can further be constrained by a user name (see FIG. 6(h)).

Figure 6A:
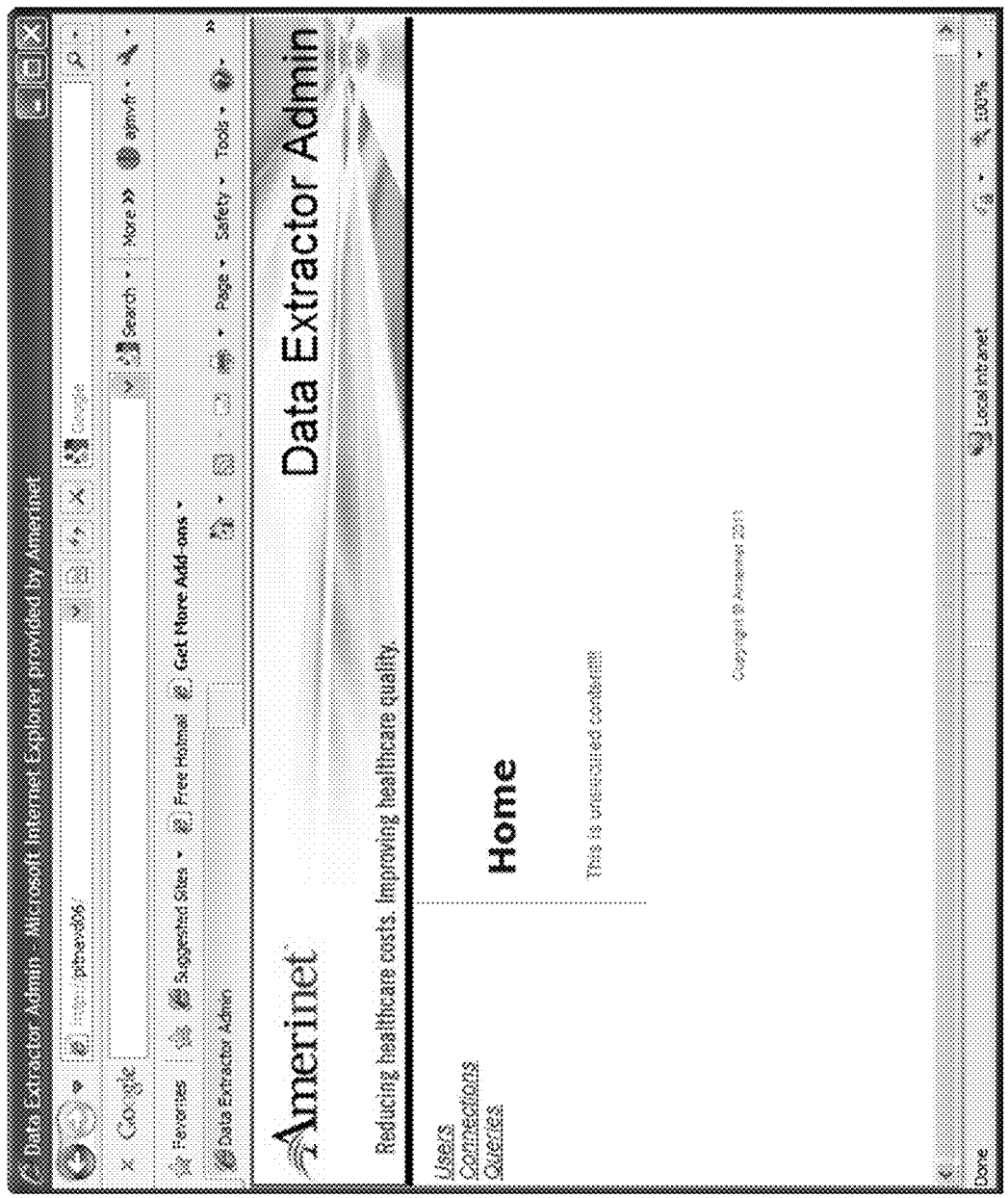
Figure 6B:
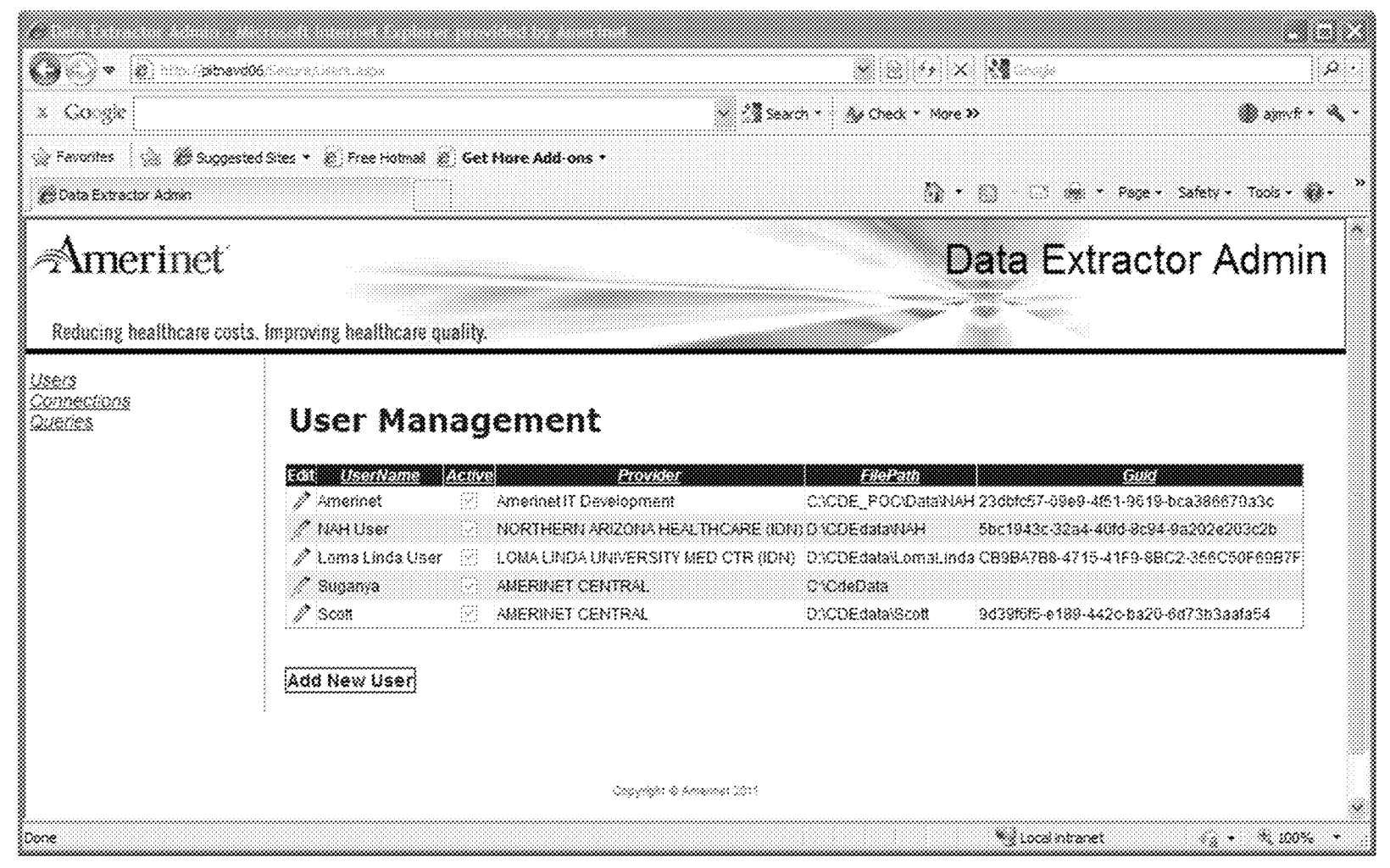
Figure 6C:
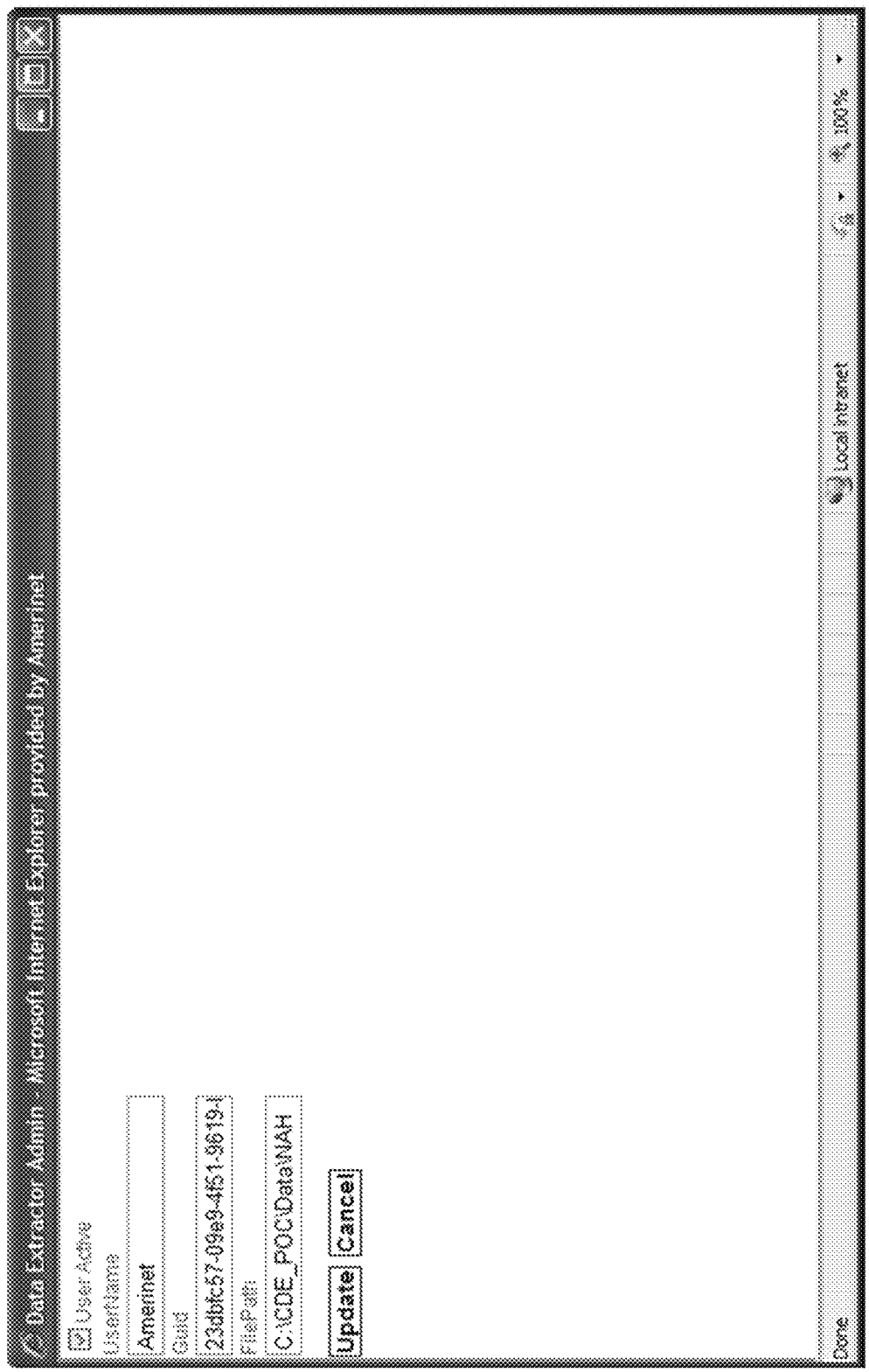
Figure 6D:
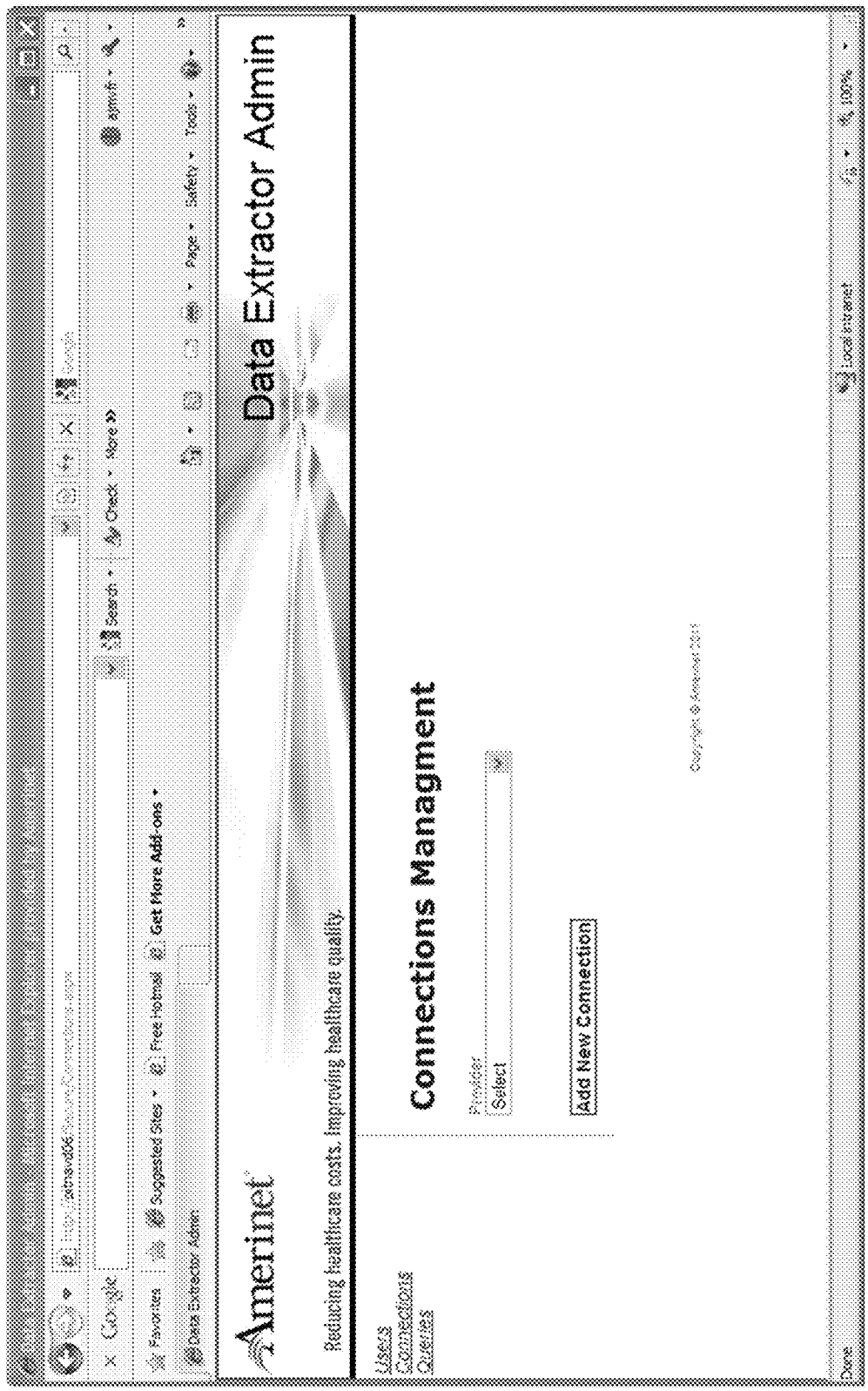
Figure 6E:
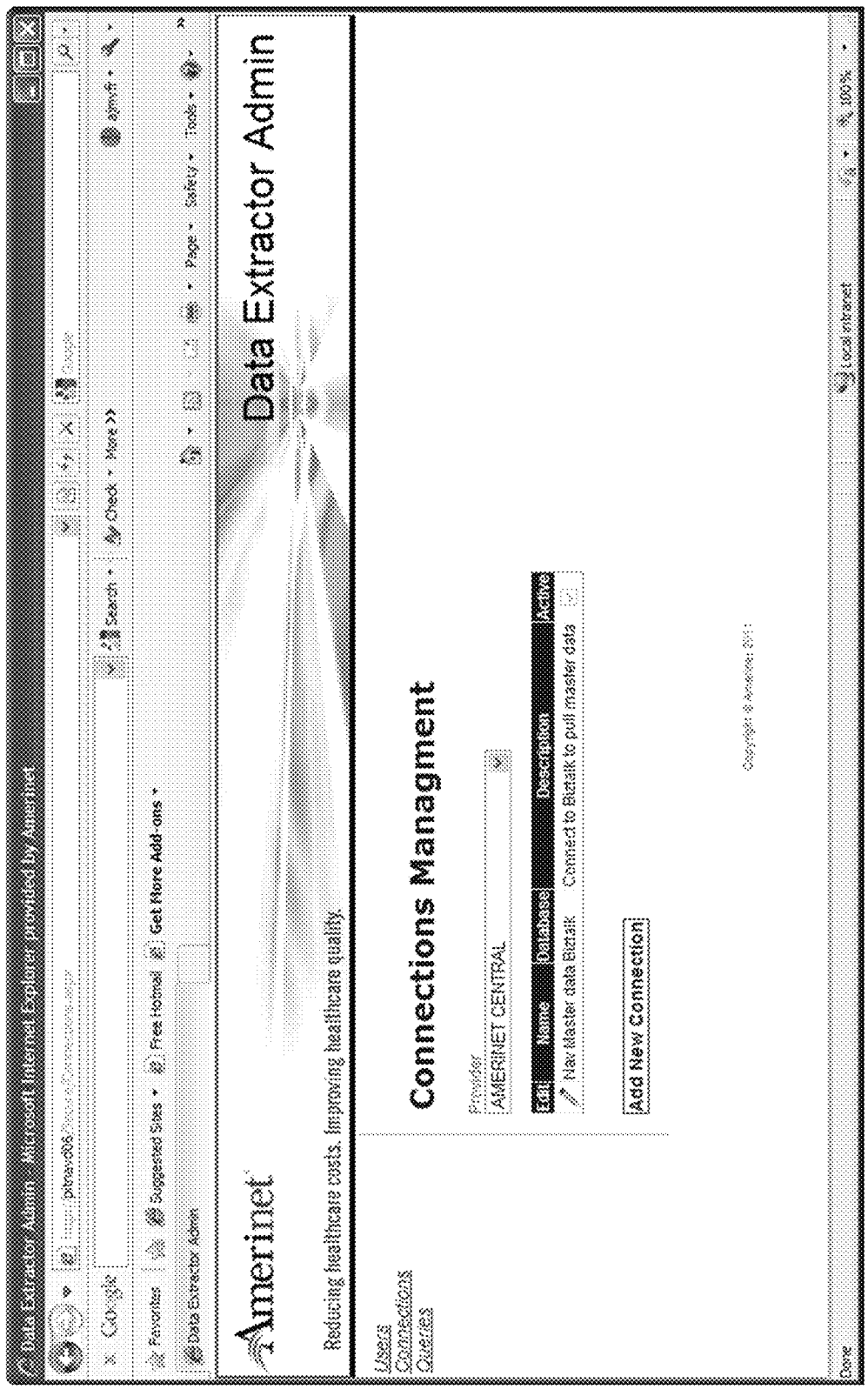
Figure 6F:
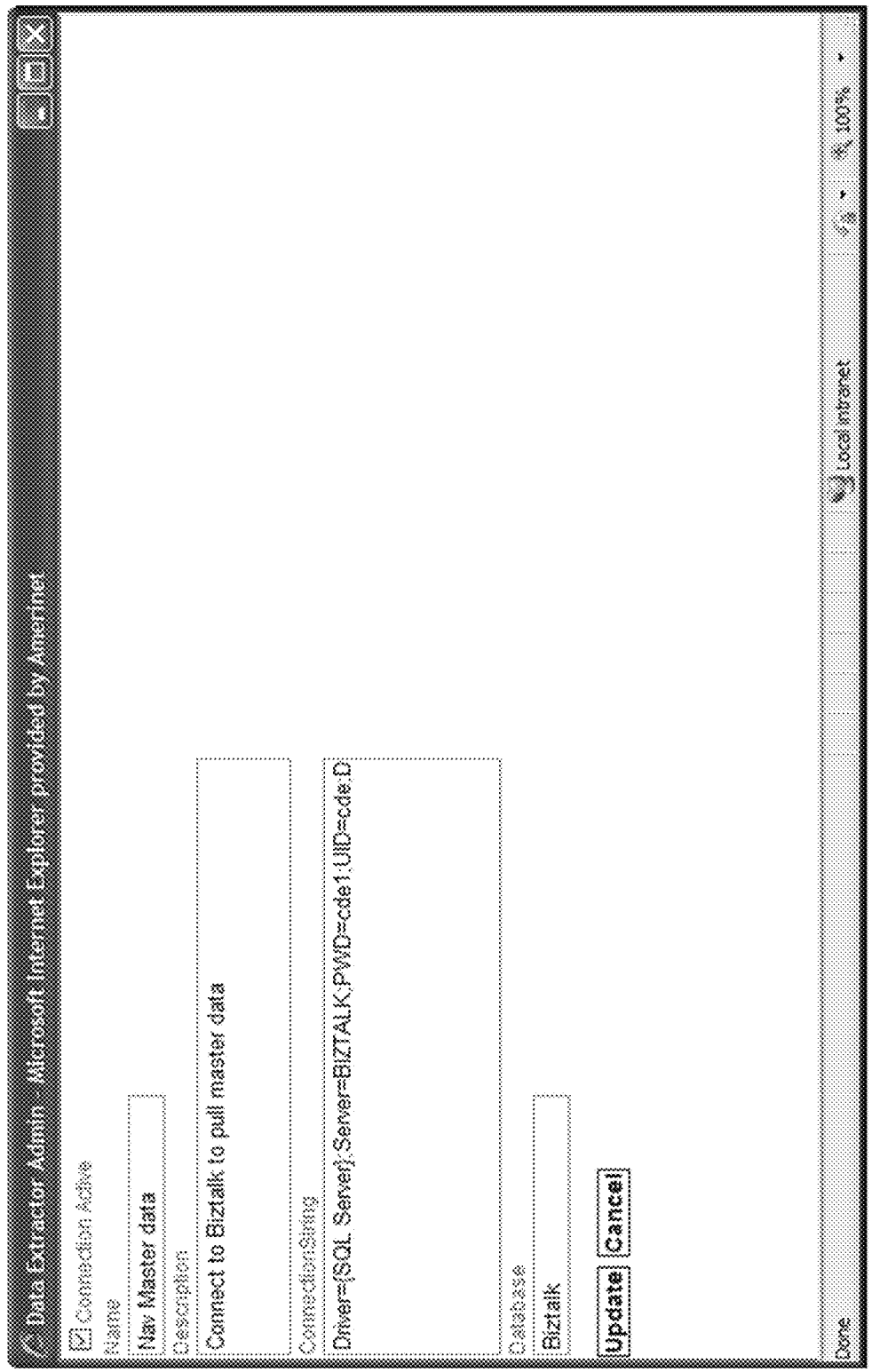
Figure 6G:
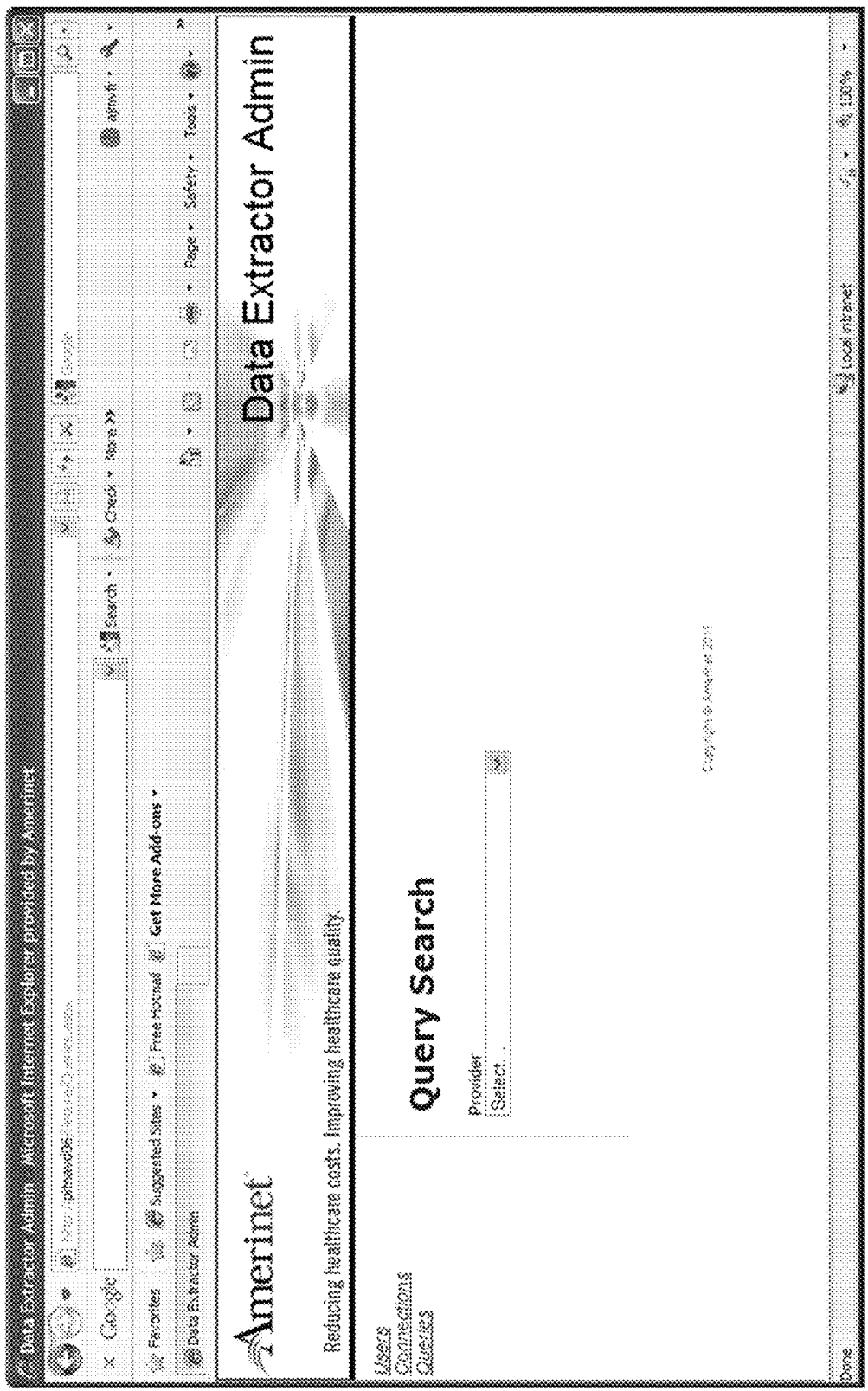
Figure 6H:
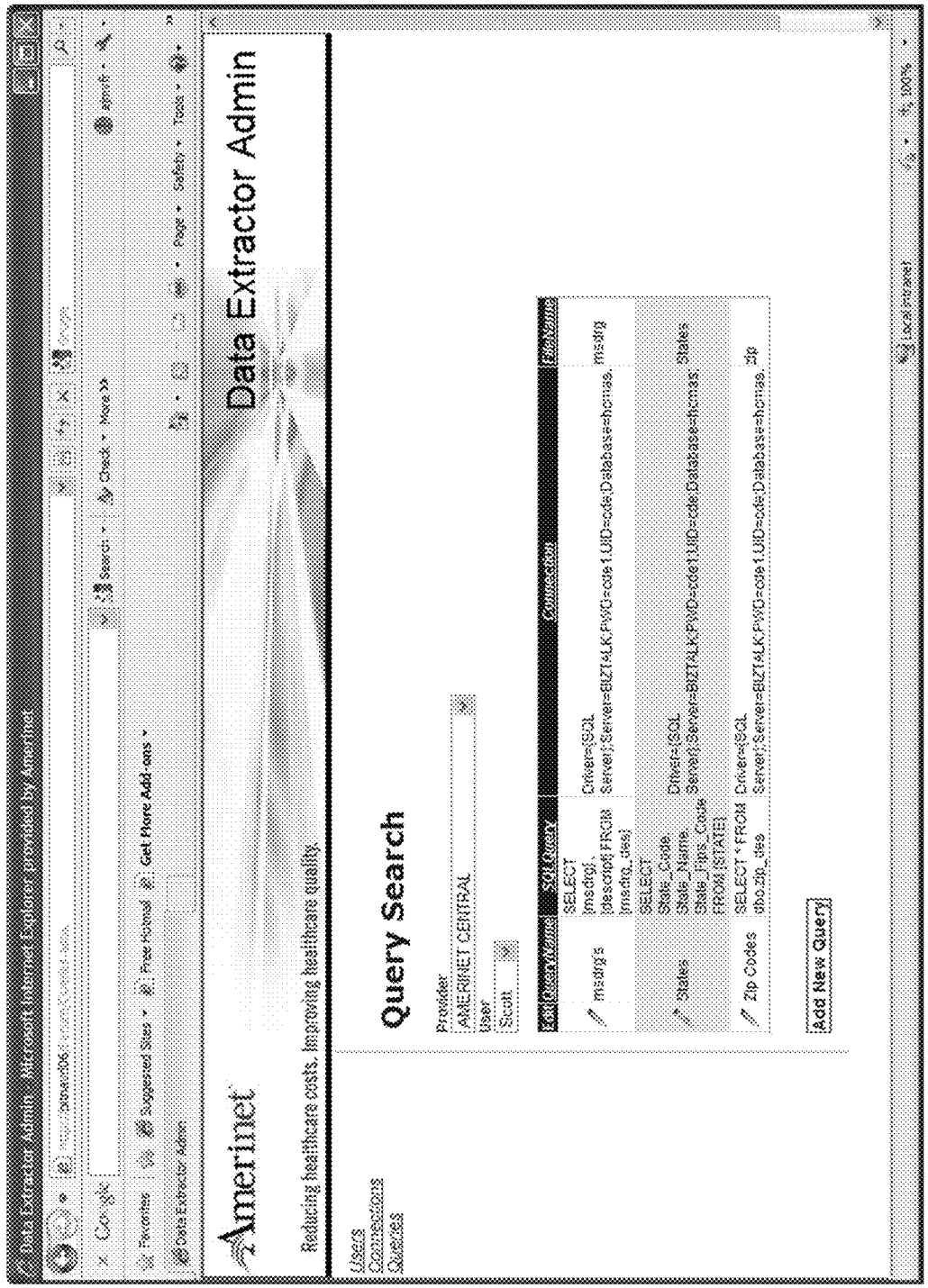

FIG. 6(h) illustrates a GUI that shows the results of a query search based on a specified customer and user name. The GUI of FIG. 6(h) lists the responsive queries in a table, with each query being identified by a name (the QueryName column), a query excerpt (the SQLQuery column), the connection corresponding to the query (the Connection column), and the name of the file into which the query results are to be written (the FileName column).

Figure 6I:
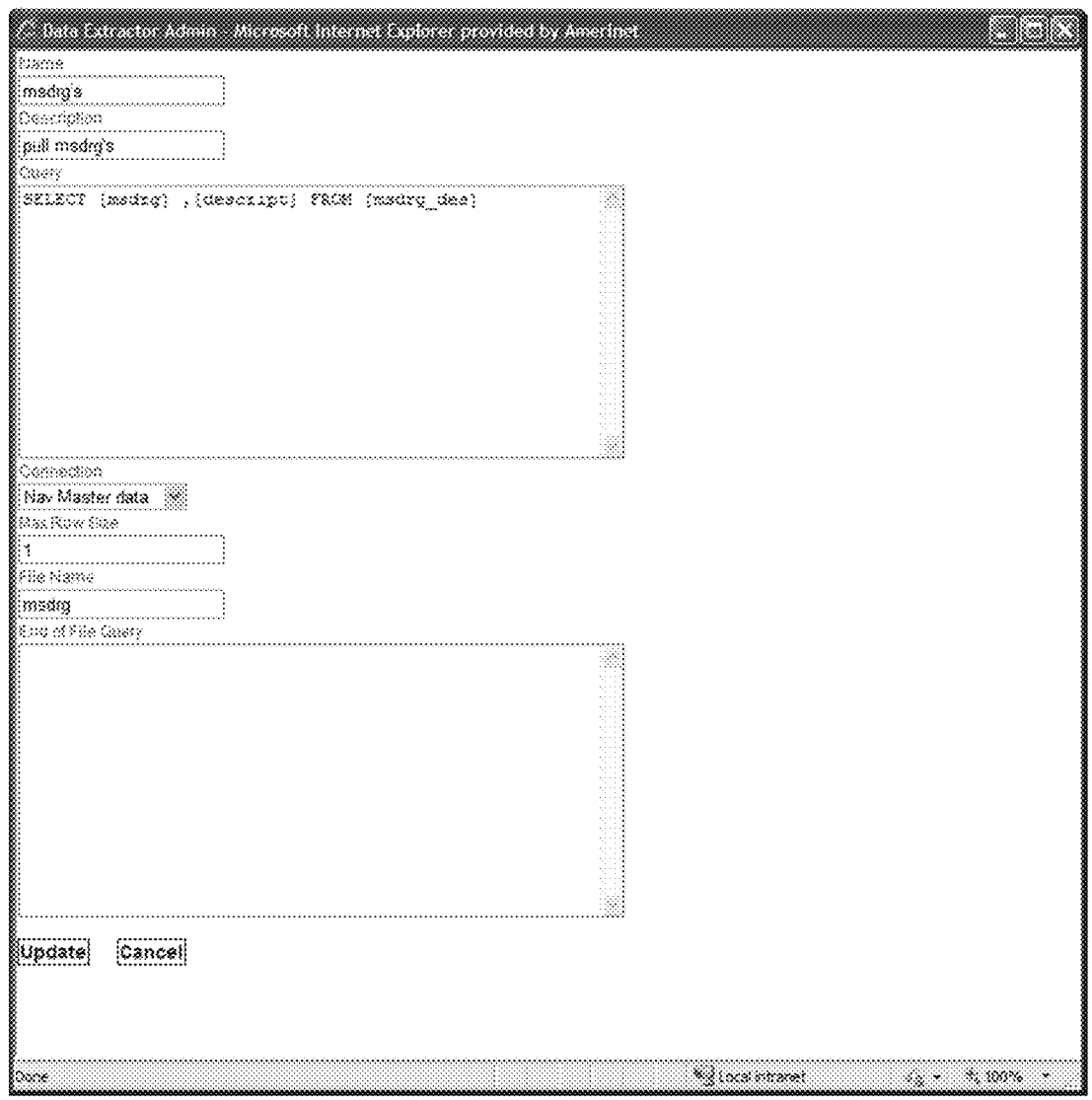

If an appropriately authorized user selects an "edit" link shown in FIG. 6(h), the user is presented with the GUI of FIG. 6(i), which provides the user with data entry fields for defining the query information for corresponding to the selected "edit" link. A similar GUI (with blank data entry fields) can be presented to the user in response to user selection of the "Add New Query" button of FIG. 6(h). The data entry fields of FIG. 6(i) include a data entry fields in which the user identifies (1) a name for the query, (2) a general description of what the query does, (3) the actual query statement, (4) the name of the connection corresponding to the query, (5) the maximum row size for the data retrieved by the query, (6) the name of the file to which the data retrieved by the query is to be written, and language for an end of file query. This end of file query can be used to determine the last record extracted from the client system by reading the extracted data stored in the data warehouse 128. This information can then be used to formulate an appendage to the extraction query to retrieve those records added/modified since the last extraction. The GUI can be configured to permit the user to identify the connection corresponding to the query through a field that can be filled from a drop down menu that is populated with a list of the connections maintained in database 126 (defined via the GUI of FIG. 6(f)).

Thus, through the GUIs of FIGS. 6(a)-(i), a user can define data structures that (1) defines the queries, (2) defines the connection strings, (3) associates the queries with corresponding connection strings, and (4) associates the queries and connection strings with customers. These data structures can be stored in database 126 for subsequent use to remotely manage the CDE's data extraction operations.

Figure 7:
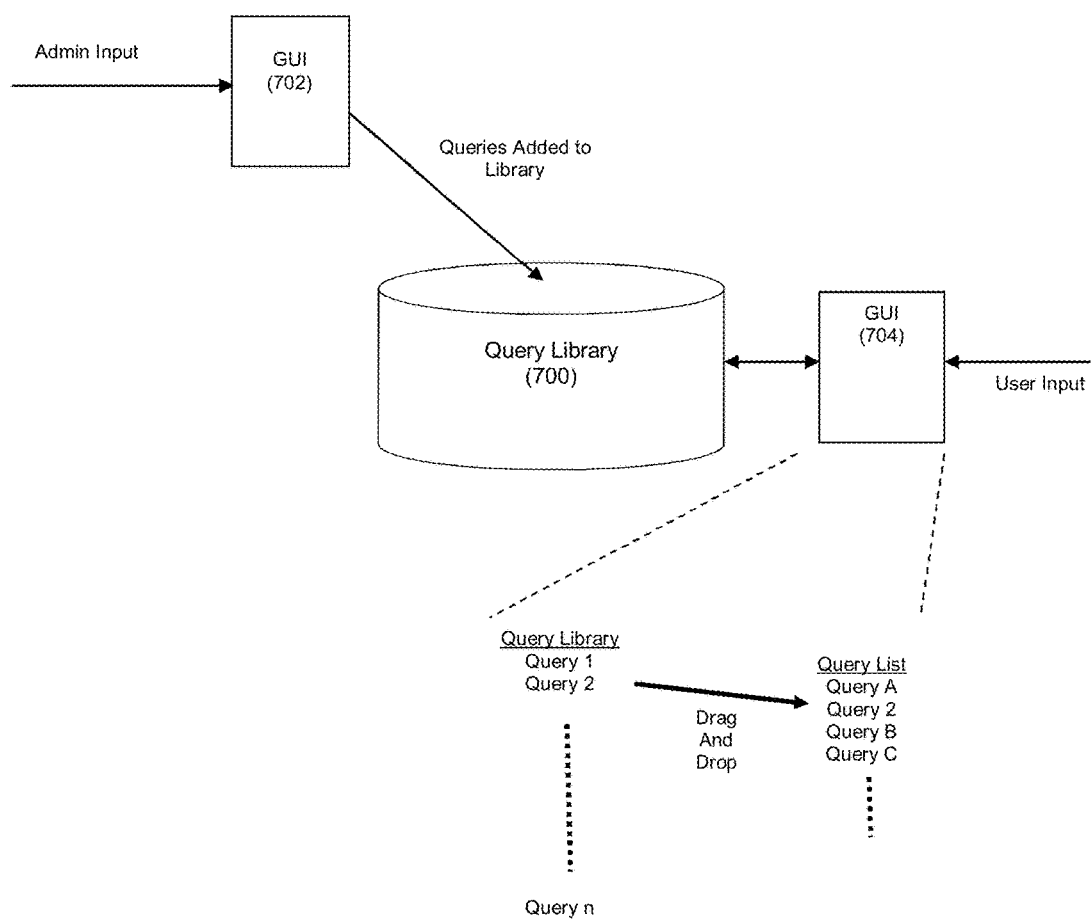
FIG. 7 depicts a technique for managing queries using a query library.

In another exemplary embodiment, the system can be configured to maintain a customer-independent query library 700, as shown in FIG. 7. Such a query library 700 can serve as a repository of queries with respect to known data systems used by organizations (e.g., PeopleSoft, Meditech). An appropriately authorized user such as an administrator of the service provider computer system can be empowered to add queries to the library (see GUI 702). Moreover, a GUI 704 can be provided that allows users to import existing queries within the library 700 into their own query lists (and optionally modify the imported query to customize the imported query for use on a particular customer's computer system). For example, a drag and drop interface can be used for this purpose, whereby a user drags an existing query from the library into their query list for use with a particular customer. By using such a query library 700, it is expected that the system can much more efficiently reduce the set up time for new customers with known systems.

In another exemplary embodiment, the query level data transformation described above in connection with FIG. 5 can be configured to translate the extracted data directly to a format used by a data presentation product (as opposed to the format of the destination database). In this way, the extracted data can be provided directly to the presentation product to enable customers to review extracted data in a meaningful visual form in a near real-time manner. For example, the XML format to which the extracted data is translated can be an XML format that is readable by a presentation product such as Amerinet Dashboard product available from Amerinet. Further still, this query level transformation can be configured to translate the extracted data in multiple copies—e.g., one directly to the format used by the data presentation product and another directly to the format used by the destination database. As such, the query strings can be configured, if desired by a practitioner, to extract data to output formats for multiple destinations.

In another exemplary embodiment, the drop location on the destination server is hard-coded into the CDE such that the CDE directs the exported XML files to a predefined location on a server of the service provider computer system. However, it should be understood that other options are available to a practitioner. For example, with another exemplary embodiment, the CDE can be configured to export the XML files to a user-defined destination. It should be understood that this destination need not necessarily be a destination within the service provider computer system. For example, the destination could also be a location on the customer computer system or some approved third party location. Further still, if desired, the CDE can be configured to export the XML files to a plurality of different user-defined destinations. This can eliminate the need for a customer to maintain multiple extracts for different destinations. A GUI can be provided for access by the user to define the destination(s) for particular queries and connection strings. For example, the GUI of FIG. 6(i) can be enhanced with an additional field that provides a drop down menu of available destinations with respect to an extraction operation for selection by a user. Further still, an additional GUI can be provided through which an administrator can define the approved destinations for extracted data.

Figure 8:
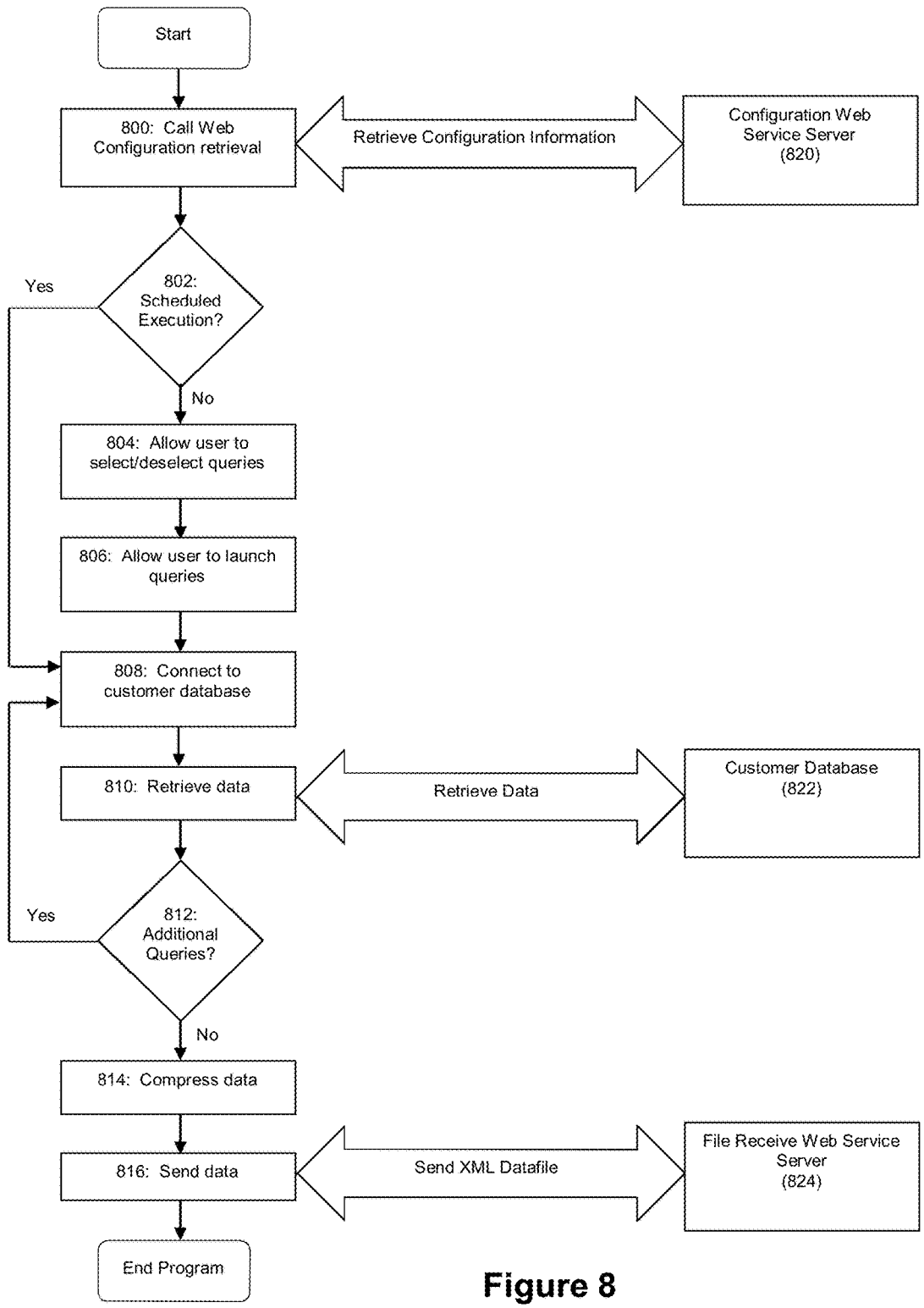
FIG. 8 depicts another exemplary process flow for a client data extractor (CDE) component.

FIG. 8 depicts another exemplary embodiment of a process flow for the CDE. At step 800, the CDE calls for a web configuration retrieval, whereby the CDE connects with a web service on a server (e.g., a configuration web service server 820 which may be resident within the service provider computer system as one of the servers 124) to obtain the configuration data for use in the data extraction. Thus, step 800 operates in a manner similar to steps 202 and 204 of FIG. 2.

At step 802, the CDE checks whether it is time to perform a data extraction. If yes, the CDE proceeds to step 808, with steps 808-816 performed automatically without user intervention. At step 808, the CDE connects to a customer database 822 using a connection string within the configuration data and step 810 whereby the CDE retrieves data from that customer database using a query within the configuration data. Thus, steps 808 and 810 operate in a manner similar to step 206 of FIG. 2.

At step 812, the CDE checks whether additional queries need to be executed for this data extraction. If yes, the CDE returns to step 808 as shown in FIG. 8. If all of the queries within the configuration data have been executed, then step 812 branches to step 814.

At step 814, the CDE performs compression on the extracted data to reduce the bandwidth and data footprint for the extracted data during the transmission to the destination. Then, at step 816, the CDE prepares one or more export data files (e.g., XML datafiles) for transmission to the destination. The destination for the export data files can be a server such as a file reception web service server 824 which may be resident within the service provider computer system as one of the servers 124. Thus, steps 814 and 816 operate in a manner similar to steps 208 and 210 of FIG. 2.

If step 802 results in a determination that the CDE is not currently scheduled to perform a data extraction, the CDE proceeds to step 804, where it waits to see if the user chooses to perform a manual extraction operation. A GUI can be made available to the user (e.g., via the CDE or through a server on the service provider computer system) through which the user can activate or deactivate specific queries for an extraction operation. Through such a GUI, the user can also launch the CDE to perform a data extraction defined by the activated queries (step 806). Thereafter, the CDE proceeds to step 808 to begin the data extraction process for the activated queries.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. It should be understood that the embodiments disclosed herein include any and all combinations of features as disclosed herein and/or described in any of the dependent claims.

What is claimed is:

1. A computer-implemented data extraction method comprising:
   providing a graphical user interface (GUI) for access by a user, wherein the providing step is performed by a client data extractor (CDE) module executed by a processor resident within a first computer system;
   the GUI receiving scheduling information from the user;
   the GUI interfacing the scheduling information from the user with a separate scheduling application;
   the separate scheduling application defining a scheduled basis for the CDE module to initiate communication with a second computer system in response to the scheduling information;
   the CDE module initiating a communication with the second computer system on the scheduled basis, wherein the second computer system is remote from the first computer system;
   after initiation, the CDE module receiving a query string and a connection string from the second computer system;
   the CDE module connecting to a data source within the first computer system based on the received connection string;
   the CDE module querying the data source based on the received query string, the query string defining the data sought to be extracted and a translation of the data sought to be extracted from a format of the data source to a format of a destination;
   the CDE module receiving data from the data source in response to the query;
   the CDE module translating the received data to the format of the destination based on the received query string;
   the CDE module assembling the translated data into a data structure; and
   the CDE module sending the data structure to the destination; and
   repeating the the initiating step, the query string and connection string receiving step, the connecting step, the querying step, the data receiving step, the translating step, the assembling step, and the sending step each time that a new data extraction from the data source is to be performed such that the first computer system is not required to locally manage the query strings and the connection strings.

2. The method of claim 1 wherein the initiating step further comprises the processor communicating an identifier associated with the first computer system to the second computer system, and wherein the query string and connection string receiving step comprises the processor receiving a query string and a connection string from the second computer system that are associated with the communicated identifier.

3. The method of claim 1 wherein the data source comprises a database configured to store relational data, and wherein the data structure comprises an XML data structure.

4. The method of claim 1 wherein the initiating step and the sending step are performed using web service requests.

5. The method of claim 1 wherein the translating step comprises translating a field identifier for data sought to be retrieved from the format of the data source to the format of the destination based on the received query.

6. The method of claim 5 wherein the destination is resident within the second computer system.

7. The method of claim 5 wherein the destination comprises a software application that provides a user with access to extracted data for analysis thereof.

8. The method of claim 1 wherein the destination comprises the second computer system.

9. The method of claim 1 further comprising:
   the processor receiving input from a user that defines the destination.

10. The method of claim 1 wherein the first computer system comprises a plurality of databases from which data is to be extracted, wherein the initiating step comprises the processor initiating a communication with the second computer system to receive a plurality of query strings and a plurality of connection strings, each connection string associated with a query string and defining a connection to one of the plurality of databases such that the plurality of connection strings define a plurality of connections to the plurality of databases, wherein the receiving step comprises the processor receiving the plurality of query strings and associated connection strings from the second computer system, the processor performing the connecting step, the querying step, the translating step, and the data receiving step for each of the plurality of received query strings and associated connection strings.

11. The method of claim 1 wherein the query string defines the data sought to be extracted and a plurality of translations, the plurality of translations comprising a first translation from the format of the data source to a format of a first destination and a second translation from the format of the data source to a format of a second destination;
   wherein the translating step comprises the processor translating the received data to the formats of the first and second destinations based on the received query string;
   wherein the assembling step comprises the processor assembling the translated data into a plurality of data structures, the plurality of data structures comprising a first data structure into which the translated data for the first destination has been assembled and a second data structure into which the translated data for the second destination has been assembled; and wherein the sending step comprises the processor sending the first data structure to the first destination and the processor sending the second data structure to the second destination.

12. The method of claim 1 wherein the query string includes a portion that is configured to control the querying step to only extract data that has been added to or modified within the data source since a previous extraction operation from the data source.

13. The method of claim 1 wherein the first computer system comprises a healthcare provider computer system.

14. A computer program product for data extraction comprising:

a plurality of instructions that are part of a client data extractor (CDE) module for execution by a first computer system and are executable by a processor to (1) provide a graphical user interface (GUI) for access by a user, wherein the GUI is configured to (i) receive scheduling information from the user, and (ii) interface the scheduling information from the user with a separate scheduling application that is configured to define a scheduled basis for the CDE module to initiate a communication with a second computer system in response to the scheduling information, (2) initiate, by the first computer system, a communication with the second computer system on the scheduled basis, wherein the second computer system is remote from the first computer system, (3) after initiation, receive, at the first computer system, a query string and a connection string from the second computer system, (4) connect to a data source within the first computer system based on the received connection string, (5) query the data source based on the received query string, the query string configured to define the data sought to be extracted and a translation of the data sought to be extracted from a format of the data source to a format of a destination, (6) receive data from the data source in response to the query, (7) translate the received data to the format of the destination based on the received query string, (8) assemble the translated data into a data structure, (9) send the data structure to the destination, and (10) repeat the initiate, string receive, connect, query, data receive, translate, assemble, and send operations for a plurality of new data extractions from the data source such that the first computer system is not required to locally manage the query strings and the connection strings; and wherein the plurality of instructions are resident on a non-transitory computer-readable storage medium.

15. The computer program product of claim 14 wherein the instructions are further configured to (1) as part of the initiate operation, communicate an identifier associated with the first computer system to the second computer system, and (2) as part of the string receive operation, receive a query string and a connection string from the second computer system that are associated with the communicated identifier.

16. The computer program product of claim 14 wherein the data source comprises a database configured to store relational data, and wherein the data structure comprises an XML data structure.

17. The computer program product of claim 14 wherein instructions are further configured to perform the initiate and send operations via web service requests.

18. The computer program product of claim 14 wherein the instructions are further configured to, as part of the translate operation, translate a field identifier for data sought to be retrieved from the format of the data source to the format of the destination based on the received query.

19. The computer program product of claim 14 wherein the first computer system comprises a plurality of databases from which data is to be extracted;

wherein the instructions are further configured to (1) as part of the initiate operation, initiate a communication with the second computer system to receive a plurality of query strings and a plurality of connection strings, each connection string associated with a query string and defining a connection to one of the plurality of databases such that the plurality of connection strings define a plurality of connections to the plurality of databases, (2) as part of the string receive operation, receive the plurality of query strings and associated connection strings from the second computer system, and (3) perform the connect, query, translate, and data receive operations for each of the plurality of received query strings and associated connection strings.

20. The computer program product of claim 14 wherein the query string defines the data sought to be extracted and a plurality of translations, the plurality of translations comprising a first translation from the format of the data source to a format of a first destination and a second translation from the format of the data source to a format of a second destination; and wherein the instructions are further configured to (1) as part of the translate operation, translate the received data to the formats of the first and second destinations based on the received query string, (2) as part of the assemble operation, assemble the translated data into a plurality of data structures, the plurality of data structures comprising a first data structure into which the translated data for the first destination has been assembled and a second data structure into which the translated data for the second destination has been assembled, and (3) as part of the send operation, send the first data structure to the first destination and the second data structure to the second destination.

21. The computer program product of claim 14 wherein the query string includes a portion that is configured to control the query operation to only extract data that has been added to or modified within the data source since a previous extraction operation from the data source.

22. An apparatus for data extraction comprising:

a processor resident on a first computer system, the processor configured to execute a client data extractor (CDE) module, wherein execution of the CDE module causes the processor to (1) provide a graphical user interface (GUI) for access by a user, wherein the GUI is configured to (i) receive scheduling information from the user, and (ii) interface the scheduling information from the user with a separate scheduling application that is configured to define a scheduled basis for the CDE module to initiate a communication with a second computer system in response to the scheduling information, (2) initiate a communication with the second computer system on the scheduled basis, wherein the second computer system is remote from the first computer system, (3) after initiation, receive a query string and a connection string from the second computer system, (4) connect to a data source within the first computer system based on the received connection string, (5) query the data source based on the received query string, the query string configured to define the data sought to be extracted and a translation of the data sought to be extracted from a format of the data source to a format of a destination, (6) receive data from the data source in response to the query, (7) translate the received data to the format of the destination based on the received query string, (8) assemble the translated data into a data structure, (9) send the data structure to the destination, and (10) repeat the initiate, string receive, connect, query, data receive, translate, assemble, and send operations for a plurality of new data extractions from the data source such that the first computer system is not required to locally manage the query strings and the connection strings.

23. The apparatus of claim 22 wherein the data source comprises a database configured to store relational data;
   wherein the data structure comprises an XML data structure;
   wherein the query string includes a portion that is configured to control the query operation to only extract data that has been added to or modified within the database since a previous extraction operation from the database and
   wherein the processor is further configured to (1) perform the initiate and send operations via web service requests, (2) as part of the initiate operation, communicate an identifier associated with the first computer system to the second computer system, and (3) as part of the string receive operation, receive a query string and a connection string from the second computer system that are associated with the communicated identifier.

24. The apparatus of claim 22 wherein the processor is further configured to, as part of the translate operation, translate a field identifier for data sought to be retrieved from the format of the data source to the format of the destination based on the received query.

25. The apparatus of claim 22 wherein the query string defines the data sought to be extracted and a plurality of translations, the plurality of translations comprising a first translation from the format of the data source to a format of a first destination and a second translation from the format of the data source to a format of a second destination; and
   wherein the processor is further configured to (1) as part of the translate operation, translate the received data to the formats of the first and second destinations based on the received query string, (2) as part of the assemble operation, assemble the translated data into a plurality of data structures, the plurality of data structures comprising a first data structure into which the translated data for the first destination has been assembled and a second data structure into which the translated data for the second destination has been assembled, and (3) as part of the send operation, send the first data structure to the first destination and the second data structure to the second destination.

26. A computer-implemented data extraction method comprising:
   providing a graphical user interface (GUI) for access by a user, wherein the providing step is performed by a client data extractor (CDE) module executed by a processor resident within a first computer system;
   the GUI receiving scheduling information from the user;
   the GUI interfacing the scheduling information from the user with a separate scheduling application; and
   the separate scheduling application defining a scheduled basis for the CDE module to initiate communication with a second computer system in response to the scheduling information; the client data extractor (CDE) module executing on the first computer system to perform a data extraction from a database of the first computer system, wherein the CDE module executing step comprises:
   the CDE module determining whether a data extraction is to be performed according to the scheduled basis; and
   in response to determining that a data extraction is to be performed on the scheduled basis the CDE module (1) sending a request to a second computer system, (2) obtaining configuration data from the second computer system in response to the sent request, wherein the configuration data comprises a plurality of query strings and a plurality of connection strings for use in the data extraction, each connection string associated with a query string and defining a connection to a database of the first computer system, (3) for each query string and its associated connection string within the configuration data, (i) using the connection string associated with that query string, connecting to the database corresponding to that associated connection string, and (ii) extracting data from that connected database using that query string, wherein the extracting step includes translating the extracted data from a format of that connected database to a format of a destination during extraction at a query string level based on data within that query string, (4) assembling the extracted data into a data structure, and (5) sending the assembled data structure to a destination.

27. A system for data extraction, the system comprising:
a first computer system; and
a second computer system for communication with the first computer system via a network;
wherein the first computer system comprises a data source and a processor, the processor configured to execute a client data extractor (CDE) module to perform a data extraction from the data source;
wherein the second computer system comprises at least one server and a memory, wherein memory is configured to store configuration data in association with a plurality of identifiers, the configuration data comprising a plurality of query strings and a plurality of connection strings, a plurality of the query strings being configured to define (1) the data sought to be extracted and (2) a translation of the data sought to be extracted from a format of a data source to a format of a destination;
wherein the CDE module is configured to provide a graphical user interface (GUI) for access by a user, wherein the GUI is configured to (i) receive scheduling information from the user, and (ii) interface the scheduling information from the user with a separate scheduling application that is configured to define a scheduled basis for the CDE module to initiate a communication with a second computer system in response to the scheduling information
wherein the CDE module is further configured to (1) determine whether a data extraction is to be performed according to the scheduled basis, and (2) in response to a determination that a data extraction is to be performed on the scheduled basis (1) send a request to the second computer system, the request comprising a request for configuration data and an identifier;

wherein the at least one server is configured to (1) receive the request for configuration data, and (2) in response to the received request, automatically (i) access the memory to identify the configuration data associated with the identifier within the received request, and (ii) communicate the identified configuration data to the first computer system;

wherein the CDE module is configured to (1) obtain the communicated configuration data from the second computer system, the communicated configuration data comprising a query string and a connection string for use in the data extraction, (2) connect to the data source based on the connection string, (3) extract data from the connected data source based on the query string, wherein the extracting operation is configured to translate the extracted data from a format of the data source to a format of a destination during extraction at a query level based on data within the query string, (4) assemble the extracted data into a data structure, and (5) send the assembled data structure to the second computer system; and wherein the at least one server is further configured to (1) receive the sent data structure, and (2) in response to the received data structure, automatically store the extracted data within the received data structure in the memory.

* * * * *